United States Statutory Invention Registration [19]

[11] Reg. Number: H66

White [45] Published: May 6, 1986

[54] PULSED PLASMA GENERATION OF EXTREME ULTRAVIOLET RADIATION

[75] Inventor: Jonathan C. White, Lincroft, N.J.

[73] Assignee: AT&T Bell Laboratories

[21] Appl. No.: 563,816

[22] Filed: Dec. 21, 1983

[51] Int. Cl.[4] ..... H01J 3/30

[52] U.S. Cl. ..... 372/5; 372/3; 372/57; 372/76; 372/69

[58] Field of Search ..... 250/493, 1; 372/5, 56, 372/76, 57

[56] References Cited

U.S. PATENT DOCUMENTS

| | | | |
|---|---|---|---|
| 4,151,486 | 4/1979 | Itzkan et al. | 372/56 |
| 4,229,708 | 10/1980 | Mani et al. | 372/5 |
| 4,369,514 | 1/1983 | Silfvast et al. | 372/76 |
| 4,380,072 | 4/1983 | Harris | 372/5 |

OTHER PUBLICATIONS

"Generation of Step Tunable . . .", *Applied Physics Letters*, vol. 31, No. 2, Jul. 15, 1977, C. Y. She et al, pp. 95-97.

"Space-Resolved Extreme Ultraviolet . . .", N. A. Ebrahim et al., *Jour. of Applied Physics*, vol. 51, No. 1, Jan. 1980, pp. 182-189.

"Extreme Ultraviolet Induced Forward . . .", K. C. Hseih et al., *Journal of Applied Physics*, vol. 51, No. 4, Apr. 1980, pp. 2242-2246.

"Generation of High-Spectral-Brightness . . .", H. Egger et al., Optics Letters, vol. 5, No. 7, Jul. 1980, pp. 282-284.

"Frequency Mixing in the Extreme Ultraviolet", J. Reintjes, *Applied Optics*, vol. 19, No. 23, Dec. 1980, pp. 3889-3896.

"Photoelectron Spectroscopy of Supersonic . . .", J. E. Pollard et al., *Review of Scientific Instruments*, vol. 52, No. 12, Dec. 1981, pp. 1837-1846.

"Multikilowatt Electron Beams . . .", J. J. Rocca et al., *Applied Physics Letters*, vol. 41, No. 9, Nov. 1982, pp. 811-813.

"Extreme Ultraviolet Emission . . .", R. D. Bleach et al., *Journal of Applied Physics*, vol. 54, No. 3, Mar. 1983, pp. 1273-1277.

"Laser-Plasma-Induced Extreme-Ultraviolet . . .", R. M. Jopson, et al., *Optics Letters*, vol. 8, No. 5, May 1983, pp. 265-267.

*Primary Examiner*—S. C. Buczinski
*Assistant Examiner*—Linda J. Wallace
*Attorney, Agent, or Firm*—Wendy K. Koba

[57] ABSTRACT

The present invention relates to a system for generating extreme ultraviolet (XUV) radiation. The process utilizes pulsed plasmas to create a high density of ions in which non-linear frequency upconversion into the XUV region can occur. In particular, metals are utilized as the lasing medium in the present invention, since the ions of these metals do not absorb wavelengths in the XUV region and a significant level of XUV output may be obtained. Conventional UV lasers are utilized as the upconverters for the ionized metals.

9 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PULSED PLASMA GENERATION OF EXTREME ULTRAVIOLET RADIATION

BACKGROUND OF THE INVENTION

1. Field of the Invention

The present invention relates to the pulsed plasma generation of extreme ultraviolet (XUV) radiation and, more particularly, to the utilization of an ionized metal as the active medium, where the discharge therefrom is pulsed to create higher states of ionization of the metal. Selected ionization states of the metal may be utilized as a non-linear medium in which UV lasers may be frequency converted into coherent XUV radiation.

2. Description of the Prior Art

Since there are no primary laser sources available which can generate radiation in the XUV region, various methods are used to obtain these wavelengths. Optical frequency mixing has provided a source of narrow-band coherent XUV radiation, as described in the article "Frequency Mixing in the Extreme Ultraviolet" by J. Reintjes appearing in *Applied Optics*, Vol. 19, No. 23, Dec. 1, 1980, at pp. 3389–3896. As discussed in the Reintjes article, coherent XUV radiation is obtained through harmonic generation and frequency mixing using rare gas halide lasers for generating the tunable XUV radiation. Rare-gas-halogen (RGH) lasers were also utilized as a source for obtaining XUV radiation in experiments by H. Egger et al reported in the article "Generation of High-Spectral-Brightness Tunable XUV Radiation at 83 nm" appearing in *Optics Letters*, Vol. 5, No. 7, July 1980 at pp. 282–284. Here, coherent XUV radiation was reported to have been produced by third-harmonic generation of a transform-limited-bandwidth KrF excimer laser in gaseous xenon. The observed XUV output, which was continuously tunable from 82.8 to 83.3 nm, had a peak power of 40 mW, a bandwidth less than 0.01 cm, and absolute frequency control to within 0.04 cm.

Another method used for the generation of incoherent XUV radiation is to employ a thin carbon foil as the target of UV radiation, where photoemission from the foil has been found to generate XUV radiation in the range 121.6 to 58.4 nm. A complete discussion of this method can be found in the article "Extreme Ultraviolet Induced Forward Photoemission From Thin Carbon Foils" by K. C. Hsieh et al. appearing in the *Journal of Applied Physics*, Vol. 51, No. 4, Apr. 1980 at pp. 2242–2246. However, this method is not preferred since provision must be made for translation or replacement of the foil since the laser shots degrade the target and each shot sees a different surface. This limits the repetition rate of the shots and adds complexity to the target chamber.

More recent work in this area has replaced the thin carbon foil with a liquid-mercury surface, where this surface does degrade even after tens of thousands of shots with a repetition rate of 10 Hz. One such exemplary method of generation XUV radiation in this manner is discussed in the article "Laser-Plasma-Induced Extreme-Ultraviolet Radiation from Liquid Mercury" by R. M. Jopson et al appearing in *Optics Letters*, Vol. 8, No. 5, May 1983 at pp. 265–267. As disclosed, incoherent XUV radiation from 100 to less than 30 nm is emitted from plasmas generated on a liquid-mercury surface. Since the target does not have to be translated, the target chamber is a simple device, where the mercury may be placed at the entrance of a vacuum monochromator. It is to be noted, however, that this emission is incoherent and can not be utilized as a laser source.

One of the persistent problems encountered in harmonic generation at deep XUV wavelengths is the background continuum absorption due to either the active medium or any background gases which may be present. If a long beam path is to be used, as in for example a 1 meter monochromator, this absorption becomes a critical problem. In the past, various methods such as differential pumping, have been used in an attempt to overcome this problem. In principle the problem can be avoided, or at least minimized, by physically confining the active medium to a small path length and utilizing completely evacuated monochromators in the XUV generation process.

SUMMARY OF THE INVENTION

The present invention relates to a technique for overcoming the above-described background absorption problem, and more particularly, to a technique for the generation of XUV radiation utilizing a lasing medium which exhibits an energy level structure which will not absorb the generated XUV radiation.

It is an aspect of the present invention to limit the amount of background continuum absorption by utilizing ionized metals as the lasing medium. Since the ionization potential of the alkali metal species is higher than the energy of the generated XUV photon, the amount of absorption is significantly reduced.

Other and further aspects of the present invention will become apparent during the course of the following description and by reference to the accompanying drawings.

BRIEF DESCRIPTION OF THE DRAWING

Referring now to the drawings.

DETAILED DESCRIPTION

Figure 1:
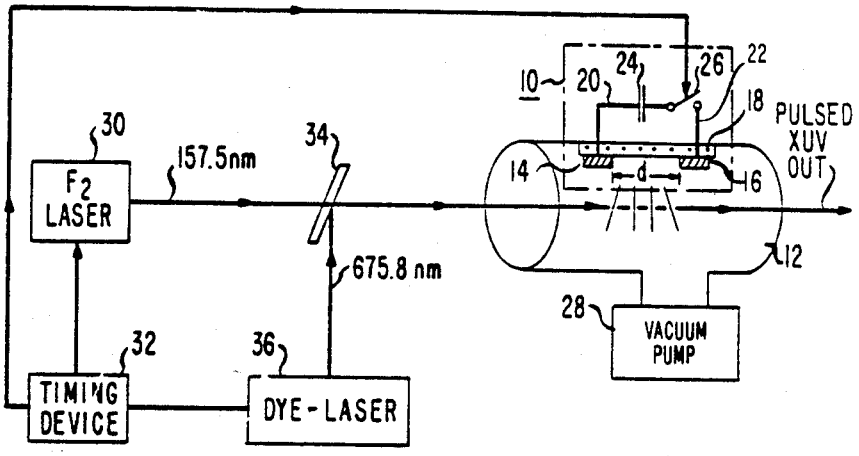
FIG. 1 illustrates an exemplary apparatus which is capable of generating pulsed XUV radiation in accordance with the present invention.

In accordance with the present invention, the generation of pulsed XUV radiation is achieved by utilizing singly ionized metals. One exemplary apparatus capable of generating XUV radiation in accordance with the present invention is illustrated in FIG. 1. It is to be understood that such an arrangement is exemplary only, since there are many methods well known in the art of ionizing metals, any of which may be used in association with the present invention. As shown in FIG. 1, a simple metal gap discharge device 10 is utilized to create the ionized metal population, where metal gap discharge device is located inside a vacuum chamber 12.

As illustrated in FIG. 1, metal gap discharge device 10 comprises a pair of metal plates 14 and 16, separated by a distance d, attached to the inner surface of vacuum chamber 12 by a layer of insulating material 18. A pair of electrodes 20 and 22 connect plates 14 and 16, respectively, to the positive and negative terminals of a capacitor 24. As shown in FIG. 1, a switch 26 is placed in the path of electrode 22 to control the connection of metal plate 16 and capacitor 24. Switch 26 is controlled by an external source described hereinafter. In operation, capacitor 24 is charged to a predetermined value, and upon being connected to both metal plates 14 and 16, causes a discharge to occur in the gap d separating plates 14 and 16. Since plates 14 and 16 are metal, the discharge will be an ionized metal species. In the arrangement illustrated in FIG. 1, the metal plates are formed from a sodium compound and the discharge will be predominantly singly ionized sodium. The sodium discharge, due to the presence of the switch, may be pulsed, where such pulsing is necessary for creating the XUV radiation in accordance with the present invention. A vacuum pump 28 is attached to vacuum chamber 12 as shown in FIG. 1 so that the ionized metal discharge will tend to travel along one direction, i.e., towards vacuum pump 28, and will not disperse along many directions inside vacuum chamber 12.

In association with the exemplary arrangement of the present invention illustrated in FIG. 1, and $F_2$ laser 30 is utilized to move the ionized metal to higher energy levels. Since the output of $F_2$ laser 30 must be pulsed, a synchronization/timing device 32 is utilized to control the output light beam. Additionally, timing device 32 may be utilized to control the opening and closing of switch 36. Synchronization/timing device 32 may comprise any controller arrangement well-known in the art, where computer control devices are most frequently employed. $F_2$ laser 30 produces an output pulse at 157.5 nm, where the duration of the pulse is controlled by timer 32. As shown in FIG. 1, the output of $F_2$ laser 30 passes through a dichroic mirror 34 and enters monochromator 12. The apparatus is disposed such that the path of light from $F_2$ laser 30 is perpendicular to the direction of the majority of the ionized metal discharge. Several photons from $F_2$ laser 30 are absorbed until the ionized metal obtains an energy close to a level from which XUV radiation will emanate. An additional laser at 675.8 nm, here shown as a dye laser 36, is utilized to bring the sum energy of the absorbed photons into near resonance with the $2p^5$ $2p^5$ $(^2P^o_{\frac{1}{2}})$ 3S level at $268766cm^{-1}$.

In accordance with the present invention, dye laser 36 produces an output capable of moving the ionized metal species to an energy level from which XUV radiation may be emitted. As shown in FIG. 1, the output of dye laser 36 is a pulse at 675.8 nm, where the pulse is reflected off of dichroic mirror 34 and enters monocromator 12 in the same direction as the output from $F_2$ laser 30. This energy of 675.8 nm is sufficient to move the ionized sodium to an energy level from which XUV radiation is generated in accordance with the present invention.

Figure 2:
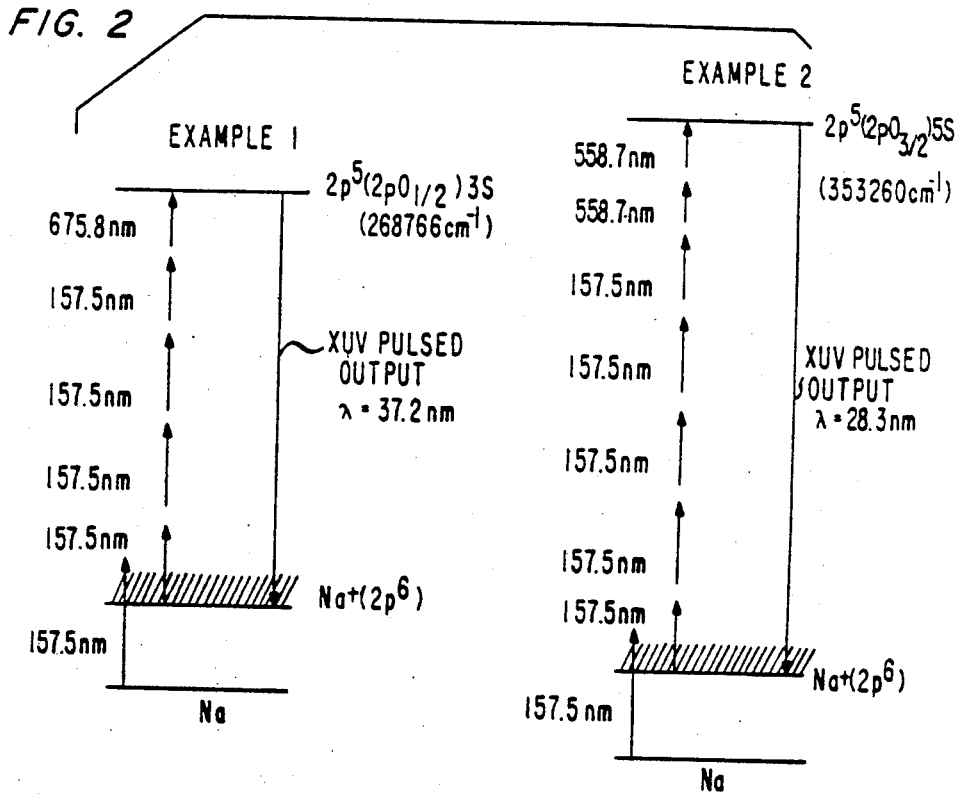
FIG. 2 illustrates the energy level diagrams for two processes of XUV generation from sodium in acccordance with the embodiment of the present invention illustrated in FIG. 1.

Energy level diagrams for two separate processes capable of generating XUV radiation from sodium utilizing the arrangement illustrated in FIG. 1 are shown in FIG. 2. In the first example, photons from $F_2$ laser 30 are absorbed to move the ionized species near to the $2p^5$ $(^2P^o_{\frac{1}{2}})$ 3S energy level. As stated hereinabove, dye laser 36 emits sufficient radiation to move the ionized sodium to the $2p_5$ $(^2P^o_{\frac{1}{2}})$ 3S level and generates XUV radiation at 37.2 nm. It is to be noted that if some ground state, neutral Na atoms are produced by the pulsed metal discharge, these atoms will be ionized to the desired $Na^+(2p^6)$ level by the absorption of one additional $F_2$ laser photon, as shown in both examples illustrated in FIG. 2. In the alternative embodiment illustrated in Example 2 of FIG. 2, five photons from $F_2$ laser 30 are absorbed, as compared with four photons in Example 1, where, and the ionized sodium population is moved near the $2p^5$ $(^2P^o_{\frac{1}{2}})$ 5S level in Example 2. Two photons from dye laser 36 are also absorbed moving the sodium population up to the desired energy level. As illustrated in FIG. 2, XUV radiation at 28.3 nm is produced by this process of the present invention.

Figure 3:
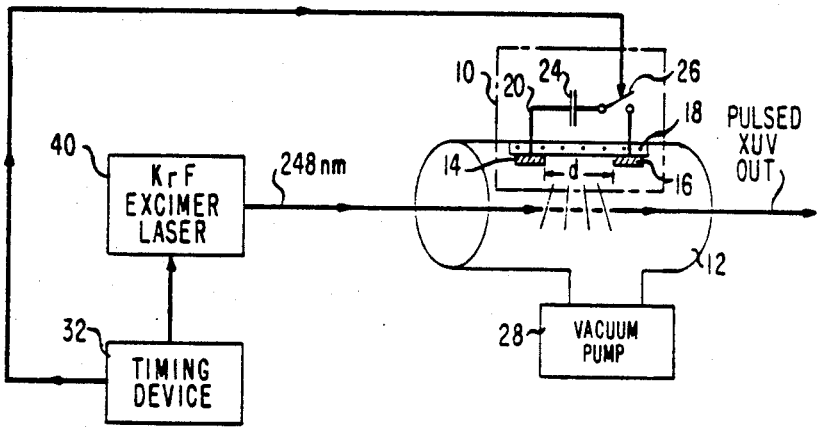
FIG. 3 illustrates an alternate arrangement of the present invention capable of producing pulses of extreme ultraviolet radiation.
Figure 4:
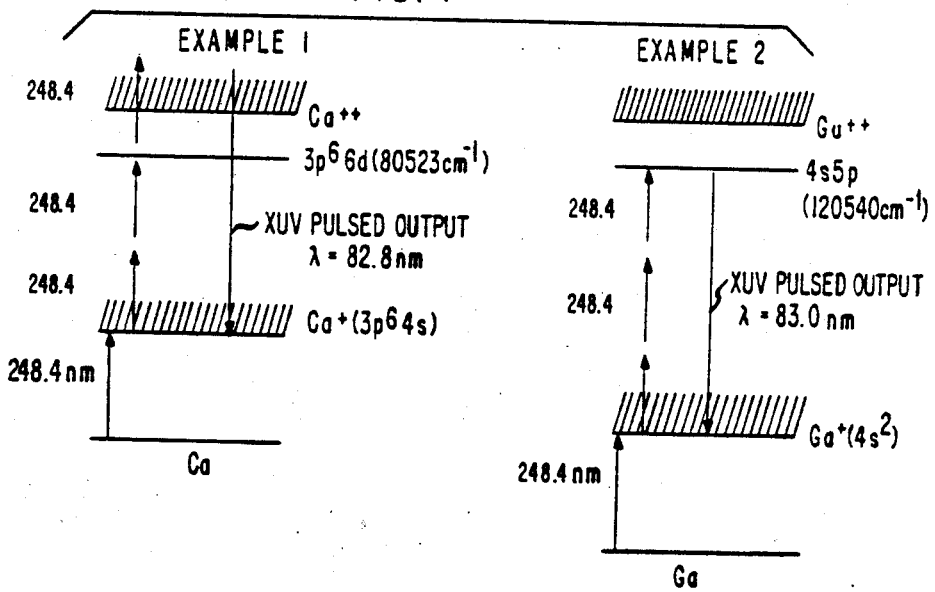
FIG. 4 illustrates the energy level diagrams for two processes of XUV generation in accordance with the embodiment of the present invention illustrated in FIG. 3.

An alternative arrangement of the present invention is illustrated in FIG. 3, where only a single UV laser is necessary to generate the XUV radiation. Here, calcium is used as metal plates 14 and 16, and a KrF excimer 40 is utilized as the UV laser. As shown, KrF excimer laser 40 emits an output at 248.4 nm, where the operation of KrF excimer laser 40 is under the control of timing device 32. The energy level diagram associated with this system is illustrated in example 1 of FIG. 4. Timing device 32 pulses KrF excimer laser 40, and three photons at 248.4 nm are absorbed, moving the population to a continuum level beyond the $3p^6$ 6d energy level. At this point XUV radiation at 82.8 nm is generated in accordance with the present invention. Alternatively, calcium metal plates 14 and 16 may be replaced by germanium and XUV radiation may be obtained utilizing the same KrF excimer laser 40. The energy level diagram associated with this process is illustrated in example 2 of FIG. 4. As shown, three photons from KrF excimer laser 40 are absorbed after creating the ionized species, and moves the ionized germanium population to the 4s 5p energy level. XUV radiation of 83.0 nm is then emitted from this energy level in accordance with the present invention.

It is to be understood that there are many other arrangements capable of producing XUV radiation which are within the scope of the present invention. The two arrangements illustrated in FIGS. 1 and 3 are exemplary only, and are not intended to limit the scope of the present invention. As stated hereinbefore, the present invention relates to the use of any metal species and a pulsed UV laser source capable of moving the ionized metal species to a region from which XUV radiation may be generated. For example, an $H_2$ Raman cell may be utilized as the UV laser source for upconverting ionized gallium, magnesium, aluminum or ionized silicon.

What is claimed is:

1. A system for generating extreme ultraviolet (XUV) radiation comprising a metal medium including a ground state, a first ionized state, and at least one high energy level state which will emit XUV radiation;

means for ionizing said metal medium so as to move at least a portion of said medium from said ground state to said first ionized state; and a pulsed UV radiation source capable of providing continuous pulses of UV radiation wherein the ionized metal medium is exposed to the continuously pulsed UV radiation and absorbs a multiplicity of the continuous pulses, said multiplicity of pulses being sufficient to move said ionized metal medium to said at least one high energy level state for emitting XUV radiation.

2. A system for generating XUV radiation formed in accordance with claim 1 wherein the pulsed UV radiation source comprises a UV laser source; and timing means to control the operation of the UV laser source such that the output from the UV laser source appears at predetermined intervals for a predetermined period of time.

3. A system for generating XUV radiation formed in accordance with claim 1 wherein the ionizing means comprises a metal gap discharge device disposed inside a vacuum chamber.

4. A system for generating XUV radiation formed in accordance with claim 3 wherein the metal gap discharge device comprises a pair of metal plates separated by a predetermined distance, disposed inside of the vacuum chamber;

an energy source connected to both of the metal plates; and a switch connected between one of the metal plates and the energy source for controlling the connection between the energy source and the pair of metal plates, wherein when said energy source is connected to said pair of metal plates the metal will ionize inside of said vacuum chamber.

5. A system for generating XUV radiation formed in accordance with claim 2 wherein the UV laser source comprises an $F_2$ laser and a tunable dye laser which are separately activated by the timing means.

6. A system for generating XUV radiation formed in accordance with claim 2 wherein the UV laser source comprises an $H_2$ Raman cell.

7. A system for generating XUV radiation formed in accordance with claim 2 wherein the UV laser source comprises an excimer laser.

8. A system for generating XUV radiation formed in accordance with claim 1 wherein the metal is a material selected from the group consisting of Na, Ga, Mg, Al, Si, Ca, and Ge.

9. A system for generating XUV radiation formed in accordance with claim 1 wherein the metal is an alkali metal compound.

* * * * *